United States Patent

Hiscock et al.

[11] Patent Number: 6,058,116
[45] Date of Patent: May 2, 2000

[54] INTERCONNECTED TRUNK CLUSTER ARRANGEMENT

[75] Inventors: James Scott Hiscock, Rockport, Mass.; Floyd Backes, Peterborough, N.H.

[73] Assignee: 3Com Corporation, Santa Clara, Calif.

[21] Appl. No.: 09/060,606

[22] Filed: Apr. 15, 1998

[51] Int. Cl.[7] .................................................. H04L 12/56
[52] U.S. Cl. .......................... 370/401; 370/406; 370/410
[58] Field of Search .................................. 370/400, 401, 370/402, 406, 407, 408, 352, 357, 360, 386, 387, 388, 410

[56] References Cited

U.S. PATENT DOCUMENTS

| | | | |
|---|---|---|---|
| 4,201,889 | 5/1980 | Lawrence et al. | 370/388 |
| 4,201,890 | 5/1980 | Lawrence et al. | 370/362 |
| 4,201,891 | 5/1980 | Lawrence et al. | 370/361 |
| 5,088,091 | 2/1992 | Schroeder et al. | 370/406 |
| 5,138,615 | 8/1992 | Lamport et al. | 370/400 |
| 5,179,558 | 1/1993 | Thacker et al. | 370/406 |
| 5,295,154 | 3/1994 | Meier et al. | 375/200 |
| 5,333,131 | 7/1994 | Tanabe et al. | 370/397 |
| 5,428,636 | 6/1995 | Meier | 375/202 |
| 5,473,599 | 12/1995 | Li et al. | 370/219 |
| 5,487,065 | 1/1996 | Acampora et al. | 370/331 |
| 5,497,504 | 3/1996 | Acampora et al. | 455/436 |
| 5,600,637 | 2/1997 | Kikuta | 370/389 |
| 5,740,156 | 4/1998 | Tanabe et al. | 370/409 |

*Primary Examiner*—Ajit Patel
*Assistant Examiner*—Bob A. Phunkulh
*Attorney, Agent, or Firm*—McGlew and Tuttle, P.C.

[57] ABSTRACT

An arrangement of trunk clusters and a method for interconnecting trunk clusters wherein the interconnection method has no single point of failure, the bandwidth between trunk clusters is not limited by the throughput of a single switch, and faults are contained within each trunk cluster. A trunked interconnection structure is provided between trunk clusters. Each switch of a trunk cluster has a logical port connected to a trunked port. The trunked port or trunk port provides a physical connection to each trunk switch of another trunk cluster. Each trunk switch of the another trunk cluster has a logical port connected to a trunked port which in turn has physical connections to each switch of the first trunk cluster. Trunked interconnect isolates faults to a single trunk cluster and there is no single point of failure and the total throughput is not limited to any single switches capacity. This always provides a single loop free path from one trunk cluster to the other or others. Multiple trunk clusters may be interconnected using point-to-point connections. A high throughput campus interconnect trunk cluster can be used to connect each building data center trunk cluster.

12 Claims, 9 Drawing Sheets

INTERCONNECTED TRUNK CLUSTER ARRANGEMENT

FIELD OF THE INVENTION

The invention relates generally to network systems such as Local Area Network (LAN) systems and techniques and device models to provide high availability interfaces, and systems. And the invention relates more particularly to an interconnection of the high availability interface systems.

BACKGROUND OF THE INVENTION

It has been generally known in the network systems field how to provide redundant capabilities. Redundant packet forwarding devices are especially useful to handle the possibility of failed links and/or failed packet forwarding devices (e.g. switches, routers, bridges). However, the detection of network topology loops and the utilization of redundant paths is problematic, particularly in view of the time involved in detecting the path and rerouting traffic. Further, protocols which have been used are complicated to configure and manage.

Traditionally the spanning tree protocol has been use to provide both Layer 1 and 2 redundancy, in switch networks, by configuring alternate paths. When a link or switch element fails, a backup link is activated. The spanning tree algorithm defines the active and backup links in the topology. Spanning tree is designed to control the many switches of the topology and has a slow (in the tens of seconds) reconfiguration time.

Spanning tree has a significant disadvantage as to the reconfiguration time. As network systems become more complex and handle additional traffic, the reconfiguration time becomes increasingly problematic. Further, spanning tree disables the redundant path. This negates the possibility of using redundant paths for increases in throughput.

U.S. patent application Ser. No. 09/014,547, filed Jan. 28, 1998 (which is hereby incorporated by reference), discloses trunk clusters, namely a packet based high speed mesh which is formed of a set of loosely coupled switches, a configuration protocol and trunked network interfaces. Each switch, in a trunk cluster, provides a single "shared LAN" by interconnecting two or more links. The attached edge devices run the trunk configuration protocol and view the trunk ports as if they are connected to a shared LAN with multiple other attached devices. The maximum throughput of the trunk cluster increases with each additional switch.

Such a trunk cluster provides significant advantages including layer 1 and layer 2 redundancy, the avoidance of the spanning tree and the ability to provide additional throughput as needed (by adding additional switches to the switch cluster). The provision of such a trunk cluster necessitates further consideration such as further interconnection, interconnecting different trunk clusters or group of trunk clusters.

A scalable switch set is disclosed in U.S. patent application Ser. No. 09/014,548. This provides a redundant switch set based on trunk connections between individual switches of the switch set.

SUMMARY AND OBJECTS OF THE INVENTION

It is an object of the invention to provide an arrangement of trunk clusters and a method for interconnecting trunk clusters wherein the interconnection method has no single point of failure, the bandwidth between trunk clusters is not limited by the throughput of a single switch, and faults are contained within each trunk cluster.

According to the invention, a trunked interconnection structure is provided between trunk clusters. With this method each switch of a trunk cluster has a logical port connected to a trunked port. The trunked port provides a physical connection to each trunk switch of another trunk cluster. It is, that another trunk cluster, each trunk switch has a logical port connected to a trunked port which in turn has physical connections to each switch of the first trunk device.

Trunked interconnect isolates faults to a single trunk cluster and there is no single point of failure and the total throughput is not limited to any single switches capacity. This always provides a single loop free path from one trunk cluster to the other or others. Multiple trunk clusters may be interconnected using point-to-point connections. A high throughput campus interconnect trunk cluster can be used to connect each building data center trunk cluster.

Each trunk cluster cooperates with associated edge devices to provide a scalable logical LAN. The trunk cluster is constructed with a set of loosely coupled switches, a configuration protocol, trunked network interfaces, and optionally a reachablilty protocol.

Each switch in the trunk cluster provides a single "shared LAN" by interconnecting two or more links. The edge devices attached to the links run a trunk configuration protocol. These attached edge devices view each physical link within a trunked port as if the attached device is connected to a shared logical LAN with multiple other attached devices.

A logical LAN is designed to provide scalability and resilience. The set of devices (end devices, switches etc.) that interconnect to a logical LAN, called edge devices, cooperate using configuration protocols and traffic steering methods required to connect to the logical LAN.

The trunk cluster is comprised of two or more trunk switches. A single logical LAN is provided by the edge devices splitting the traffic (directing traffic flow) across the links in a trunk port. Each trunk switch provides a separate path within the trunk cluster (multiple parallel paths are provided). The two or more separate paths between edge devices allow the logical LAN to increase bandwidth by adding more trunk switches and automatically decrease bandwidth in the event of a link failure and/or in the event of a trunk switch failure.

As each trunk switch only carries part of the traffic between edge devices, each trunk switch does not need to and must not participate in any topology control or discovery protocol. Spanning tree, IGMP (Internet Group Management Protocol), and GARP (Generic Attribute Registration Protocol) packets are flooded. Unicast MAC (Media Access Controller) source addresses are learned and used to intelligently forward/filter unicast packets to minimize flooding within the "shared LAN" and increase throughput. The maximum throughput of the trunk cluster increases with each additional trunk switch.

Each MAC device of an edge device transmits a hello signal to MAC devices of other edge devices. The hello signal includes a trunk or edge device ID identifying the respective edge device of the MAC device transmitting the hello signal. Each MAC device records the edge device ID's of said hello signals received from other edge devices. These recorded edge device ID's are formed into an hello list for each MAC device. The TCMP agent of an edge device forms a trunk list for each other edge device. Each trunk list for a particular other edge device includes MAC addresses of the present edge device which received the hello signals from the respective one of the other edge devices. For example, if edge device A had three MAC devices which received hello signals from edge device B, edge device A would have a trunk list for edge device B which contained those three MAC devices. When edge device A received traffic for edge device B, edge device A would divide the traffic among the three MAC devices in the trunk list for edge device B. This dividing of traffic received by edge device A for edge device B, is according to the standard trunking convention. In this way, trunking can be accomplished through a plurality of switches in a mesh instead of just over a plurality of links where all the links start and stop at the same nodes. Also the trunking of the present invention allows links to be active and increase data rates, where previously those links would have been inactive due a redundancy decision by a spanning tree algorithm.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Referring to the drawings in particular, the invention comprises a packet based high speed mesh 10 which is referred to herein as a trunk cluster. The trunk cluster 10 includes a plurality of switches 20 or switches A through N. The trunk cluster is constructed of loosely coupled switches 20 based on a configuration protocol, trunked network interfaces, and optionally a reachablilty protocol.

Figure 1:
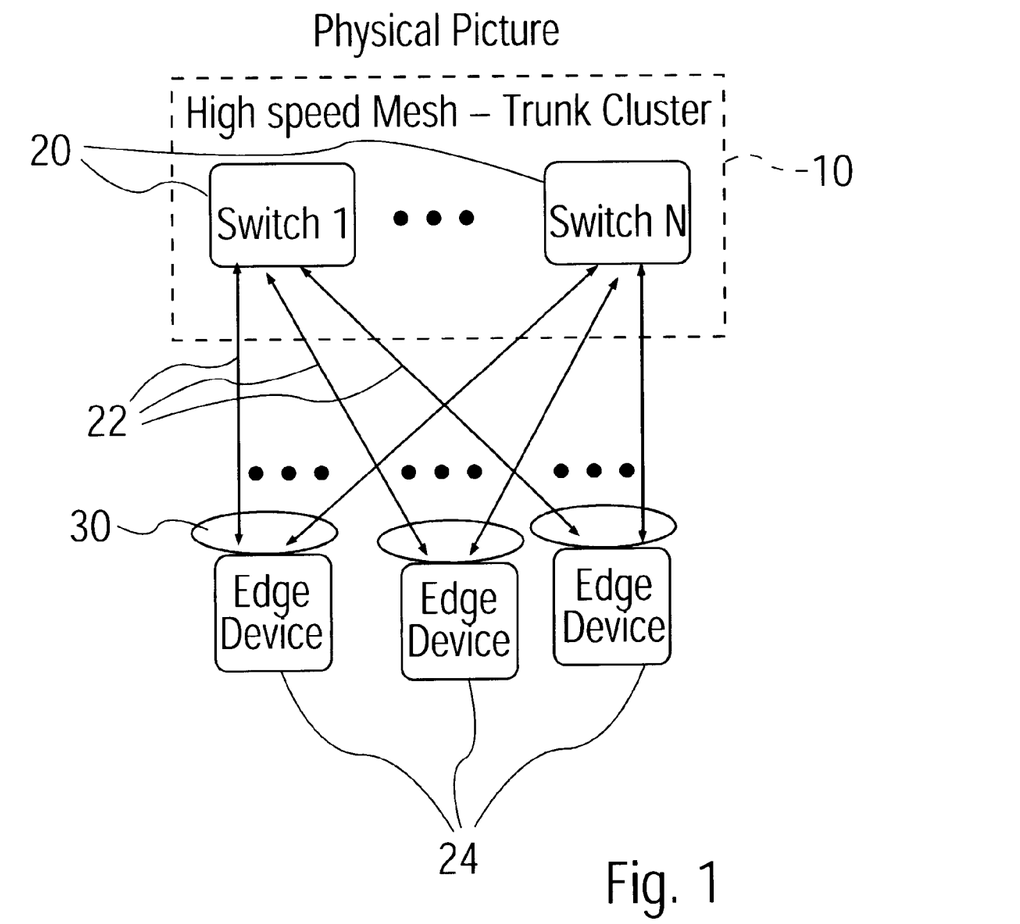
FIG. 1 is a schematic diagram showing the general scheme of the trunk cluster simple redundant switch set according to the invention.

As shown in FIG. 1, each switch 20, in a trunk cluster 10, provides a single "shared LAN" by interconnecting two or more links 22. Edge devices 24 are attached to the trunk cluster via links 22 running a trunk configuration. A plurality of links comprise a trunked port 30.

Figure 2A:
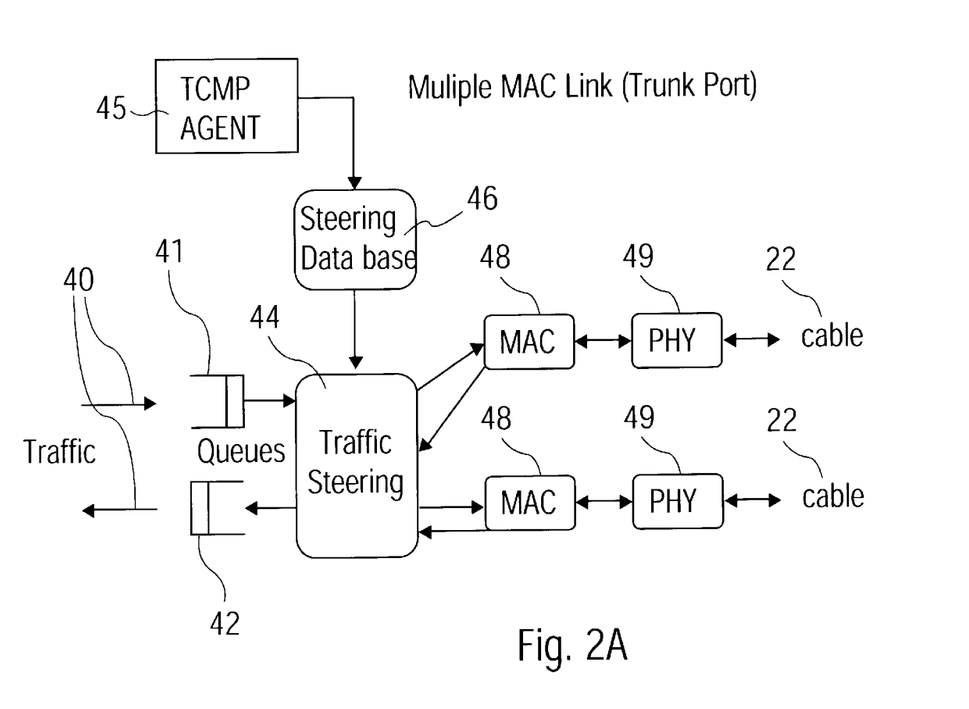
FIG. 2A is a diagram showing traffic flow through a multiple link trunked port.
Figure 2B:
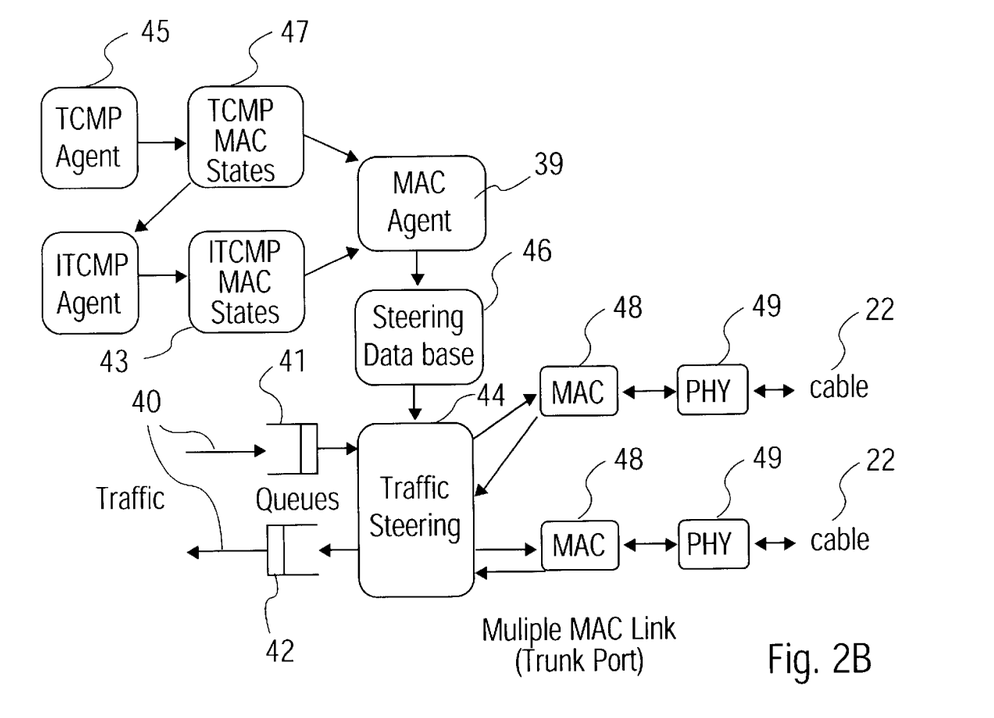
FIG. 2B is a diagram showing traffic flow through a multiple link trunked port of a trunk cluster interconnected with at least to one other trunk cluster.

FIG. 2 illustrates the traffic flow 40 through a multiple link trunked port such as multiple link trunked port 30. FIG. 2 shows transmit queue 41, receive queue 42, traffic steering means 44, steering data base 46, media access controllers (MACs) 48, physical layers 49 and connected cable (link 22). The trunked port 30 acts as a single port, but utilizes multiple physical links 22. The traffic steering means 44 is the logic that knows which MAC 48 to use when transmitting a packet. The traffic steering means 44 dequeues transmit packets, examines the packet, consults the steering data base 46 and transfers the packet to the appropriate MAC 48. The steering data base 46 is constructed by information obtained by the reachability protocol or trunk configuration management protocol (TCMP).

Figure 3:
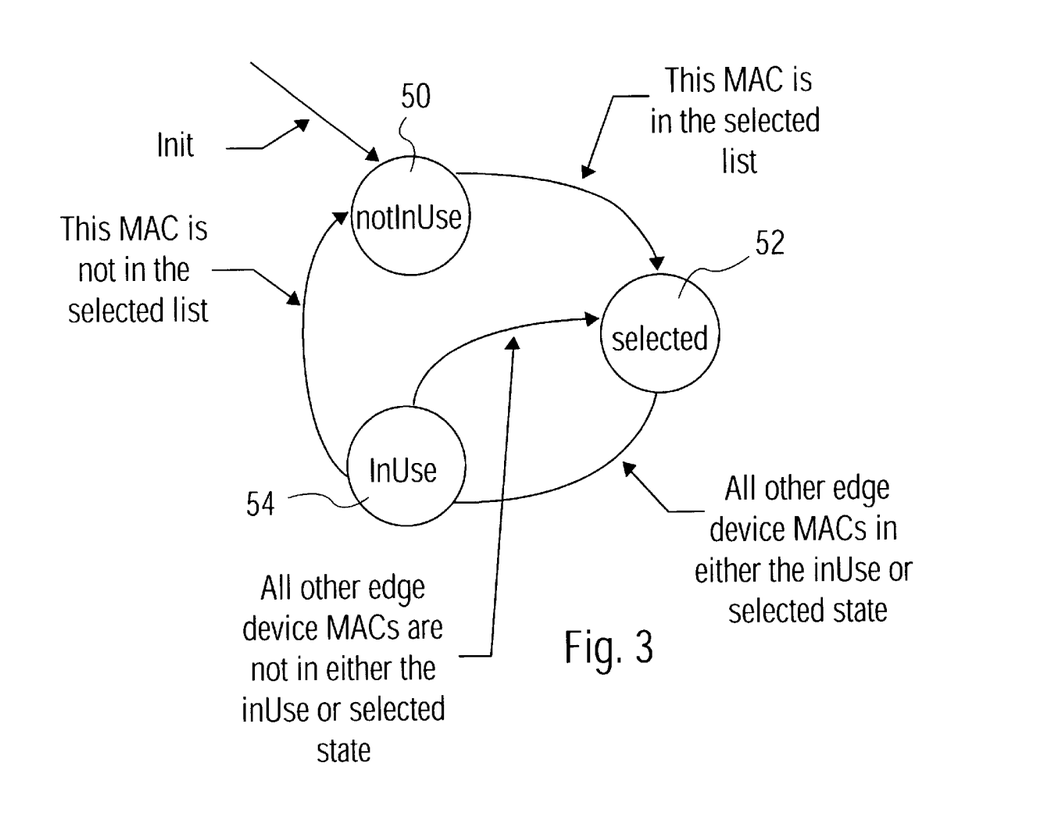
FIG. 3 is a state diagram showing the state of the media access controllers connected to the trunk cluster.

FIG. 3 shows a state diagram of the MACs 48. From the perspective of trunking, a constituent MAC 48 can be in one of the following states.

not in use. A MAC 48 in the not in use state 50 has not been selected for active participation in the trunk. A MAC 48 in this state 50 should neither transmit nor receive LLC (Logical Link Control protocol-defined in IEEE 802.2) frames. This should be the initial state for all MACs 48 of a trunk. A trunk MAC 48 should remain in this state indefinitely, if the underlying network link 22 is down. If TCMP is enabled for a particular trunk, then the MAC 48 may remain in this state 50, even if the underlying network link is up, if TCMP determines that configuration errors preclude its active participation in the trunk.

selected. A MAC 48 in the selected state 52 has been selected for active participation in the trunk, but it has not yet made the transition into active use. A MAC 48 in this state 52 should neither transmit nor receive LLC frames. A MAC 48 in this state is eligible to make a transition to the in use state 54 as soon as TCMP confirms that all other MACs 48 connected to the same network have also been selected. If TCMP is not enabled for a trunk, then no MAC 48 for that trunk should ever enter this state.

in use. A MAC 48 in the in use state 54 is in active use on the trunk. A MAC 48 in this state may transmit and receive LLC frames. If a trunk is manually configured (the connections are manually assigned), then a MAC 48 will transition to this state as soon as the underlying network link is up. If TCMP is enabled (for control and configuration), on the other hand, then a MAC 48 will make a transition to the in use state as soon as it confirms that all other MACs 48 connected to the same logical network (the same switch 20) have also been selected.

There is a separate instance of TCMP (a TCMP-agent) for each individual trunk. Initially every MAC 48 starts in the not in use state. Every TCMP "hello time", a TCMP-agent (a software based means 45 writing to the traffic steering means 44) transmits a TCMP "hello message" on every MAC 48. The hello message contains the sender's TCMP node trunk or edge device ID which uniquely identifies the instance of a trunk on a particular node. The hello message also contains the trunking MAC 48 state of the transmitting MAC 48. The hello message is transmitted to a special TCMP multicast address.

The TCMP-agent maintains a current and previous learned node trunk list (steering data base 46) for every MAC 48. Whenever the TCMP-agent receives an TCMP hello message, it adds the node trunk ID to the current list for that MAC 48. If more node trunk IDs are learned than the maximum allowable, then a list overflow indicator is set. The learned node trunk list and list overflow are set to null initially and after TCMP reselection processing.

Every TCMP reselection time, the TCMP-agent performs reselection processing. The goal of reselection is to select the set of MACs 48 which are eligible to go in use. The TCMP-agent accomplishes this by identifying the current learned node trunk list which is common to the greatest number of MACs 48 using the following steps:

1. The TCMP-agent first rejects any list which is null or overflowed.

2. The TCMP-agent also rejects any list which contains a received node trunk ID which is identical to the receiving trunk's node trunk ID (since this indicates that there are two MACs 48 on the same trunk which connect to the same network).

3. From the remaining set of lists, the TCMP-agent selects the list(s) which is common to the greatest number of MACs 48. This biases selection towards activating the widest pipe (path—the activated links/switches) possible. If there is no tie, then a list is selected. Otherwise the process continues.

4. If multiple lists are common to the same number of MACs 48, then the TCMP-agent selects the list(s) which is longest. For equal bandwidth pipes, this biases selection towards connecting the greatest number of nodes. If there is no tie, then a list is selected. Otherwise the process continues.

5. If multiple lists are common to the same number of MACs 48 and they connect the same number of nodes, then the TCMP-agent selects the list containing the numerically smallest non-intersecting node trunk ID. For example given two lists of node trunk IDs, 3-4-6-7 and 3-4-5-8, the second list wins, because 5 is the lowest non-intersecting ID. There cannot be a tie resulting from this step.

Once the TCMP-agent has selected a learned node trunk list, it forces MAC 48 state changes based on the selection. (If no list has been selected, then the TCMP-agent force all MACs 48 into the not in use state). The TCMP-agent forces all MACs 48 whose current learned node trunk list differs from the selected learned node trunk list into the not in use state. The agent forces all MACs 48 with identical lists and not already in the in use state into the selected state. It allows MACs 48 with identical lists that are already in use to remain in use.

Following this reselection process, the TCMP-agent will copy each MAC's current learned node trunk list to its previous list and then reset each current list. This allows the reselection process to be performed completely anew each period. Note that the previous list is used during quick recovery from network link outages.

The final step of MAC 48 activation/deactivation involves further MAC 48 state transitions based upon feedback received via the MAC 48 state field of subsequent hello messages.

The TCMP-agent effects a MAC 48 state transition from selected to in use once that MAC 48 has received a hello message from every previously learned node trunk indicating a MAC 48 state of either selected or in use. As long as the most recently received hello message from any of the learned node trunks remains not in use, then the TCMP-agent does not allow the MAC 48 to go in use. This feedback loop ensures that all of the MACs 48 on the same network have concurring reselection processes. Note that a lack of concurrence might be caused by conditions such as a stuck transmitter or various sorts of configuration errors.

The TCMP-agent also uses the feedback presented by the MAC 48 state field to effect MAC 48 state transitions from in use back to selected. This occurs when an in use MAC 48 receives a hello message from any previously learned node trunk indicating a MAC 48 state of not in use.

The TCMP-agent should ignore the MAC 48 state field in any hello messages received from any node trunks which were not previously learned. The TCMP-agent should defer processing of such new node trunks until the next reselection process.

Figure 4:
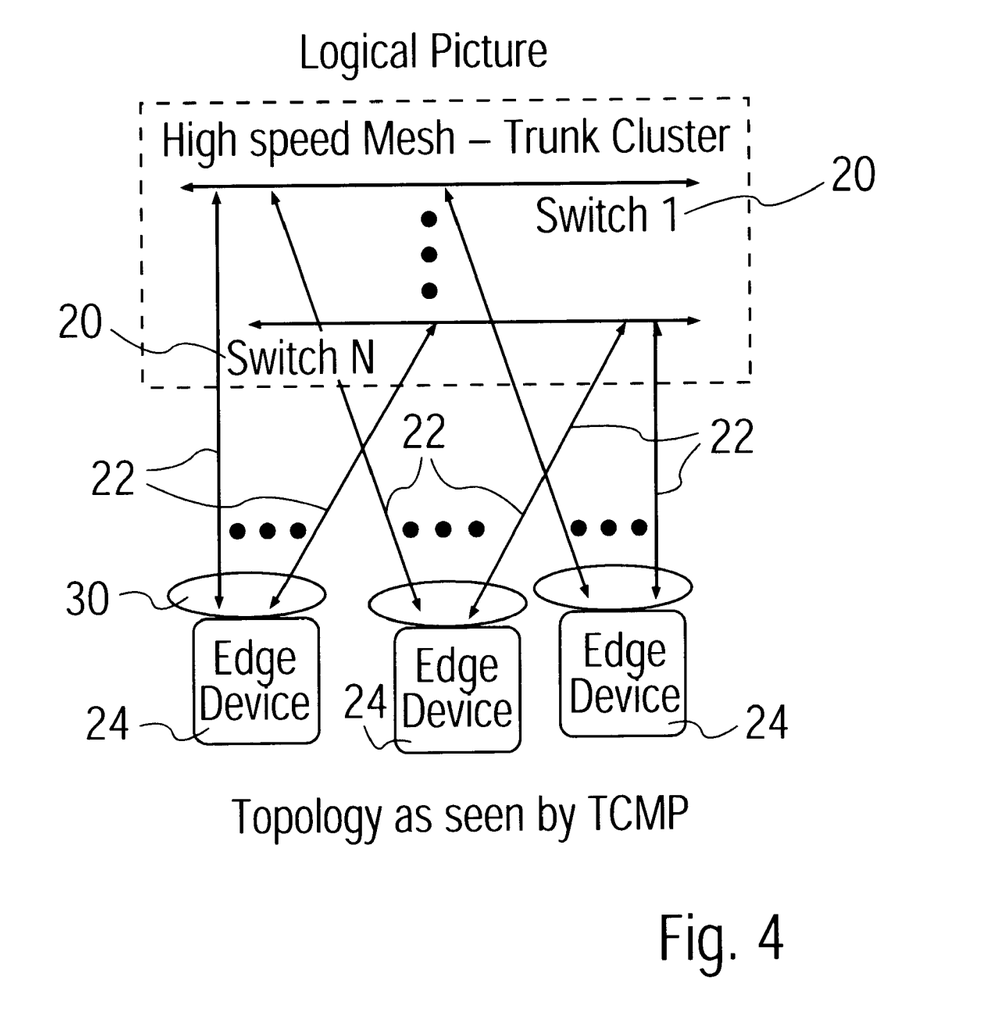
FIG. 4 is a view similar to FIG. 1 showing the logical topology as seen by the edge devices.

FIG. 4 provides the view of the trunked ports of the edge devices (e.g. end device or switches) 24 as seen by the trunk configuration management protocol (TCMP). Each edge device 24 is connected to the other edge devices 24 by multiple paths (link 22 and trunk switch 20). Each trunk switch 20 only provides one "shared LAN" path such that it carries only a part of the traffic between edge devices 24. Each trunk switch 20 does not need to and must not participate in any topology control or discovery protocol. Spanning tree, TCMP, IGMP, and GARP packets are flooded.

Although each switch 20 does not participate in any topology control or discovery protocol Unicast MAC 48 source addresses are learned and used to intelligently forward/filter unicast packets. This is desirable to minimize flooding within the "shared LAN" and increase throughput. The maximum throughput of the trunk cluster increases with each additional switch.

As shown in FIG. 1, the edge devices 24 connect to a trunk cluster via trunked links 22. Basic trunking and trunking enhanced with station reachability are both contemplated.

Basic trunking may be provided which requires at least one physical connection to each switch (A through N) 20 in the trunk cluster 10. This is referred to as equal reachability. With equal reachability, the destination address is associated with all links 22 of the trunked ports 30. This prevents any single link attachments to the trunk cluster. If a link is lost, leaving no remaining links to that switch, then the trunk configuration protocol will eliminate links connected to that switch. Effectively removing that switch from trunk cluster. Basic trunking uses an "all or none" selection of MACs 48 in a Trunk group. This scheme denies use of a switch 20 in a trunk cluster 10 for all edge devices 24 if a single edge device 24 loses its last link to that switch. This maintains equal reachability for all stations or edge devices 24 over the links 22 in a trunk group.

An enhanced trunking scheme may also be used. The enhanced trunking scheme determines if reachability is equal across all links in the trunk group. If reachability is unequal then the station addresses that have unequal reachability are discovered, packets destined to stations with equal reachability are steered to the transmit link using basic trunking, and packets destined to stations with unequal reachability are steered using a different method. This different method could range from static link assignment, with one destination address assigned to one physical port, to a partial trunking group, wherein one destination address can be assigned to a subset of the links 22. In the case of a two link trunk group, all stations with unequal reachability will have a static assignment to the only link they are reachable by. To implement this enhanced trunking, changes must be made to the TCMP and to the traffic steering method, and a station address distribution protocol is required Station unicast MAC 48 addresses (for the switches A–N 22) that are reachable via an edge device 22 can be discovered by one of the methods described below.

The GURP application (GARP Unicast Registration Protocol) utilizes the GARP protocol (IEEE 802.1,q,p) (GARP Unicast Registration Protocol) and distributes the reachability of unicast MAC 48 addresses via an edge device. This protocol would only need to run when the trunk configuration management protocol discovers unequal reachability (unequal unempty trunk ID lists) on its trunked links 22. The GURP messages are sent on all the links in a trunk group. The edge devices 24 note which MAC 48 addresses (for the switches A–N 22) are not reachable on all the links 22 in a trunk cluster 10. The MAC 48 addresses that have unequal reachability are then steered by a mechanism different than the basic trunking across all the links in a trunk group. If this trunk group contains two links then the MAC 48 addresses that have unequal reachability are assigned to the only link they are reachable.

Another scheme is TCARP (Trunk Cluster ARP). With this scheme MAC 48 address reachability is discovered when needed. As with the GURP scheme above all MAC 48 addresses (for the switches A–N 22) are known to be equally reachable if the trunk configuration management protocol does not discover unequal unempty trunk ID lists on its trunked links. If the edge device 24 is an endsystem, the reachability of an address is determined when the end system 24 wants to send a packet to that MAC 48 address. If the edge device 24 is a switch, the reachability of an address is determined when a MAC 48 address is learnt and entered in the forwarding database.

The reachability of a MAC 48 address is determined by sending a query on all the links in the trunk group. The edge device that provides connectivity to that MAC 48 address replies on the link the query was received. If the replies are not heard on all the links in the Trunk group the address is determined to have unequal reachability.

The MAC 48 address is assigned to one of the links which is reachable. This assigned scheme can vary from static link assignment to a sub-trunking group.

Figure 5:
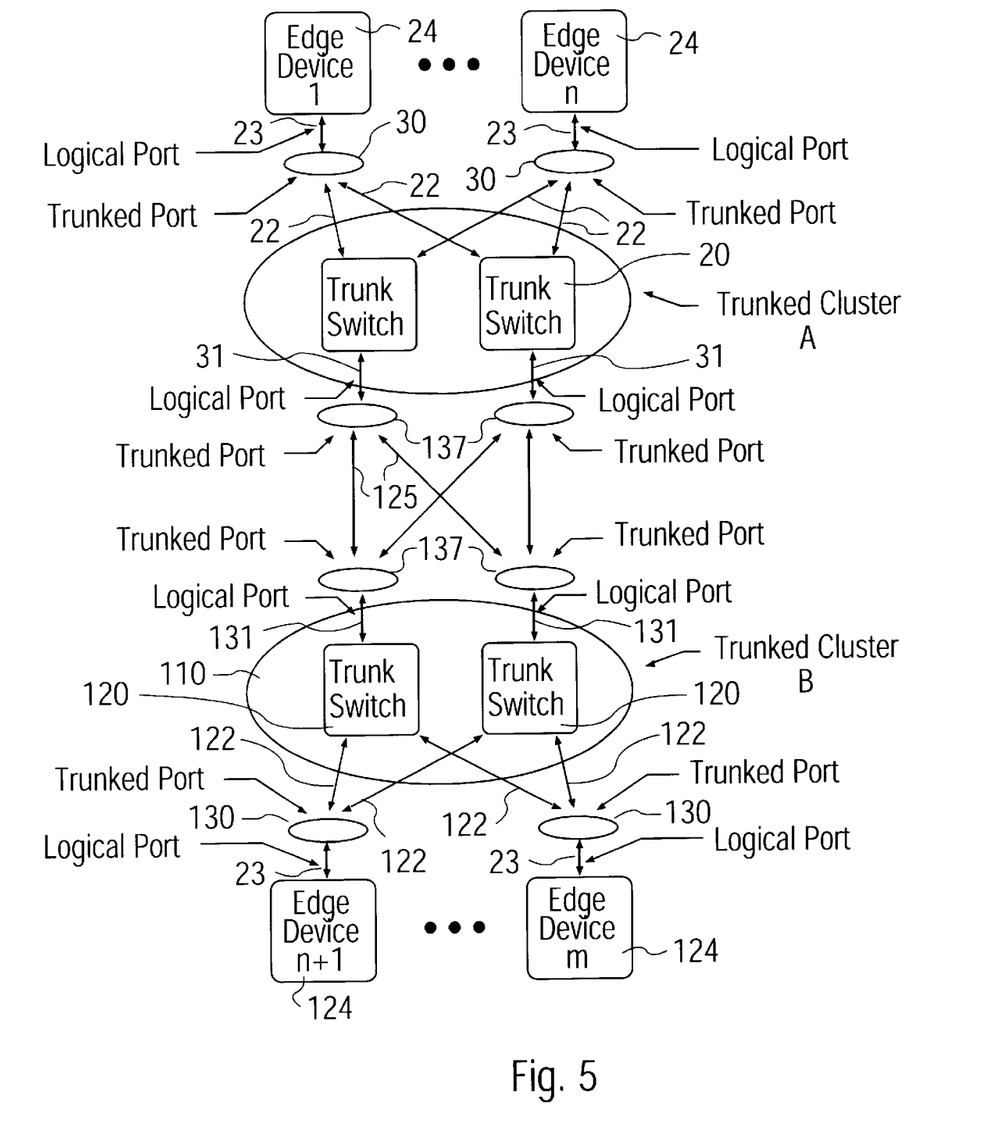
FIG. 5 is a schematic diagram showing the scheme for interconnecting trunk clusters.

FIG. 5 shows an arrangement according to the invention wherein the trunk clusters are interconnected. The trunk cluster of FIG. 5 is as shown in FIG. 1. The individual trunk switch elements 20 are connected by links 22 to trunk port 30. In this way, each edge device 24 is connected to each trunk switch 20 of the trunk cluster 10. As is known in the art, the switch 20 may be provided with a plurality of ports. A logical port 31 is connected to a trunked port 30. This is provided for interconnection with other edge devices through the another trunk cluster 110.

Another trunk cluster 110 includes a plurality of trunk switches 120. In a manner similar to trunk cluster 10, trunk cluster 110 is connected via links 122 to trunk ports 130. The trunk ports 130 are connected via logical ports 123 to edge devices 124.

A key feature of the interconnect system is the use of a trunked interconnect. Point to point connections or links 125 extend from each trunk port 137 to a trunk port 137 of the other trunk cluster. For example, a trunk switch 120 of a trunk cluster 110 has a logical port 131 connected to a trunked port 137. The trunked port includes links 125 or point to point connections from the associated trunked port 137 to each of the trunked ports associated with the switches 20 of trunk cluster 10. This interconnection method allows multiple trunk clusters to be interconnected using such point-to-point connections 125. This always provides a single loop free path from one trunk cluster to the other. Further, this isolates faults to a single trunk cluster and there is no single point of failure. Further with this interconnection system the total throughput from one trunk cluster to another is not limited by the capacity of any single switch.

The Interconnected Trunk Management Protocol (ITCMP) is a management protocol for the interconnection between trunk clusters (mesh switches). ITCMP is similar to TCMP described above. Every ITCMP hello time, a ITCMP-agent (a software based means 45, writing to the traffic steering means 44) transmits a ITCMP "hello message" on every MAC 48 of the logical trunked ports 137. The hello message is as described above and includes a senders ITCMP trunk cluster ID, the trunking MAC state of the transmitting MAC. The unique identifier is a trunk cluster ID which is unique for the switch set. The procedure continues as noted above with resulting MAC state changes as discussed above. The ITCMP system is quite similar to the TCMP system described above except trunk cluster ID's are passed around with ITCMP.

Trunk switches transform all received TCMP hello messages into TCMP relay messages by changing the messageType from helloMessage to helloRelay. The resulting TCMP relay messages are sent to the other Trunk Clusters.

Trunk Switches process the relay message with their TCMP agent to form a list of MAC states. The MAC agent performs a logical AND of the output from the TCMP agent and the output from the ITCMP agent and writes the Steering data base with the result (see FIG. 2a).

If an implementation can not disable only transimition to a physical link while still allowing packets to be received on that link, then the ITCMP agent must reflect the state output from the TCMP agent in the ITCMP MAC state. The ITCMP agent communicates this MAC state information in the ITCMP hello messages to prevent the other Trunk Cluster from sending packets to a MAC in the notIn Use state.

Equal reachability is preferably used for trunk interconnected trunk clusters. The destination address is associated with all links 125 of a trunked port 137.

Figure 6:
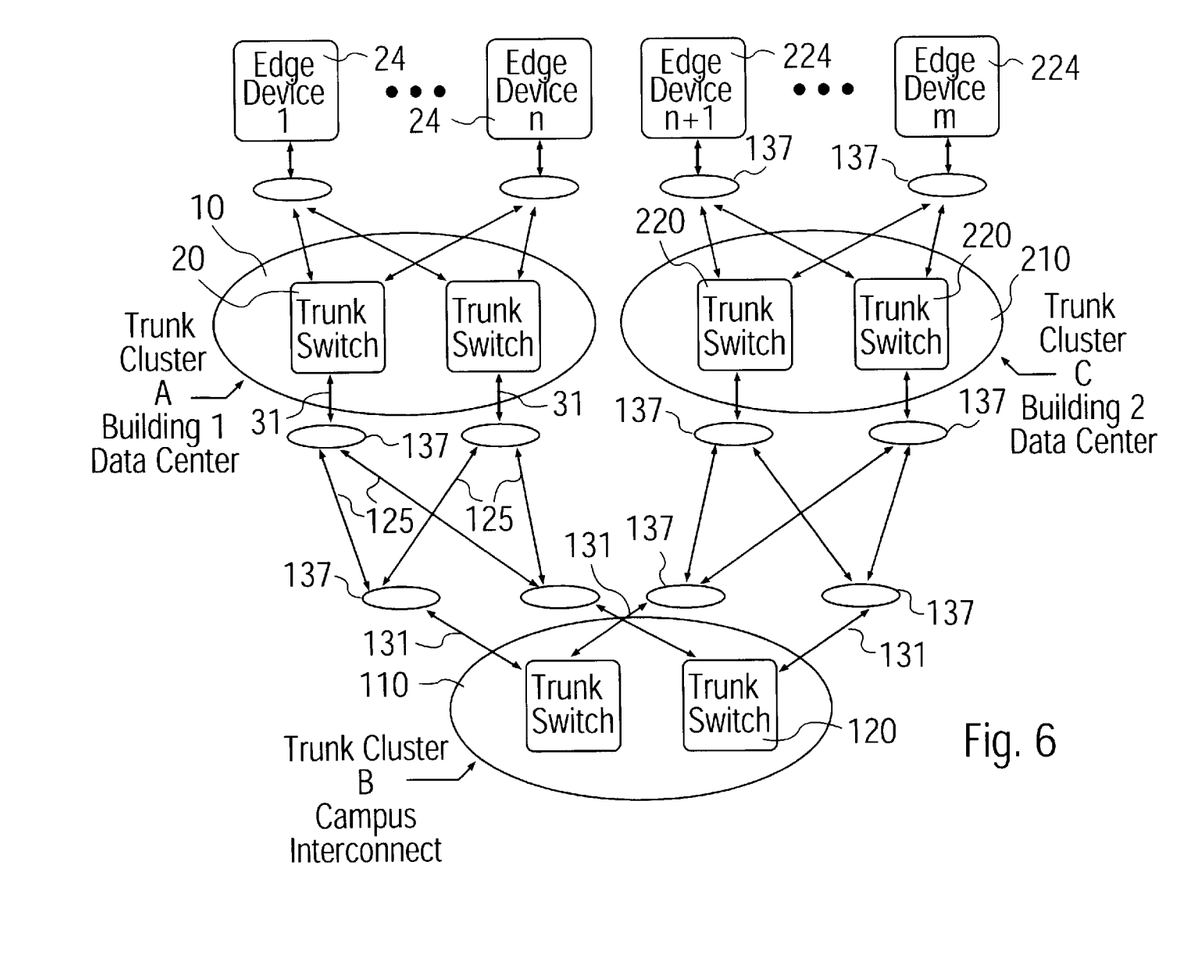
FIG. 6 is a similar to FIG. 5 showing a high speed LAN core with multiple interconnecting trunk clusters.

FIG. 6 shows the same arrangement as in FIG. 1 however in this situation trunk cluster 110 forms a campus interconnect device for connecting trunk cluster 10 to trunk cluster 210, via trunk cluster 110. Here, the switches 120 of trunk cluster 110 have additional logical ports 131 which are connected to other trunk ports 137. Each connected trunk port 137 has individual point to point links 125 to the trunk ports 137 of trunk cluster 210. This additional interconnection provides the trunk cluster as a high throughput campus interconnect trunk cluster that can be used to connect for example a trunk cluster 10 in one building (building 1) to a trunk cluster 210 in another building (building 2).

Figure 7:
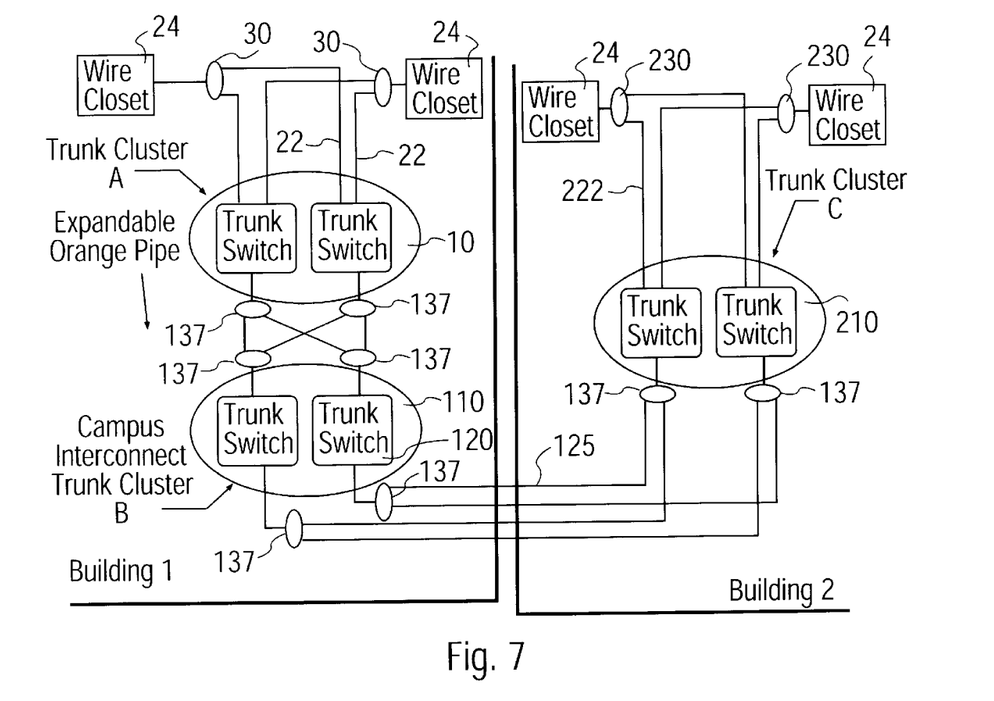
FIG. 7 is functionally the same structure as FIG. 6 shown in the context of a Campus LAN.

FIG. 7 shows the concepts of the interconnect trunk cluster 110 wherein the switches 120 are not connected to edge devices. Instead, one logical port of each trunk switch 120 is connected to one of two different trunk ports 137. The point-to-point links 125 are employed as discussed with reference to FIGS. 5 and 6. In the arrangement shown in FIG. 7, the trunk cluster 10 is connected by links 22 to trunk ports 30 however in this case the edge devices are designated "wiring closet", namely one or more connected devices 24. The trunk cluster 110 is also connected to trunk cluster 210. Trunk clusters 10 and 110 are provided in building 1 while trunk cluster 210 is provided in building 2. Trunk cluster 210 has links 222 to trunk ports 230 connected to wire closets 24.

Figure 8:
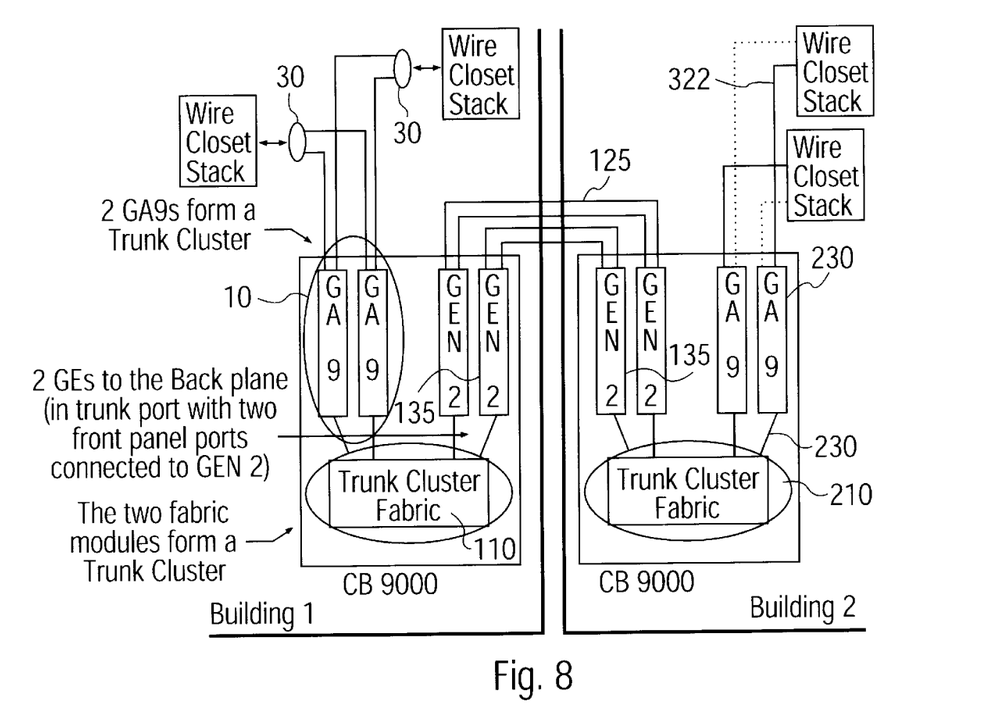
FIG. 8 is functionally the same structure as FIG. 7 shown as a CORE BUILDER 9000 chassis implementation.

FIG. 8 shows an implementation of the interconnection arrangement discussed above. This is the CORE BUILDER 9000 chassis implementation, using the 3 COM Corp. CORE BUILDER 9000 chassis product. According to this preferred embodiment, two GA9s are provided in a CORE BUILDER 9000 chassis (CB 9000) and form the trunk cluster 10. A GA9 is a 12 port Gigabit Ethernet (GE) switch with 9 GE front panel ports and 3 GE backplane ports is connected to the chassis fabric. The two fabric modules in the chassis CB 9000 are each 24 port Gigabit Ethernet switch modules which form the trunk cluster 110. Each GEN 2 module provides front panel access to the chassis fabric ports and to form the trunk ports 137 and three connection lines to the backplane. The trunk cluster fabric 210 is based on two or more switches. Links 125 connect the GEN 2 devices 135. The trunked ports 137 are formed at the connection of each GEN 2 135 to the backplane and the switching fabric 210 that forms the trunk cluster. The GA9s in building 1 cooperate to form the trunk cluster 10. However, in building 2 the GA9s are connected by redundant links 322 to the wire closet stack. The trunk ports 230 are formed at the backplane based on the three connection lines to the backplane of the GA 9.

While specific embodiments of the invention have been shown and described in detail to illustrate the application of the principles of the invention, it will be understood that the invention may be embodied otherwise without departing from such principles.

What is claimed is:

1. A method of trunking a plurality of mesh switches, the method comprising the steps of:

providing a first mesh switch with a first mesh first switch element with an associated TCMP agent and a first mesh second switch element with an associated TCMP agent;

providing a second mesh switch with a second mesh first switch element with an associated TCMP agent and a second mesh second switch element with an associated TCMP agent;

connecting said first mesh first switch element with said second mesh first switch element by a link and MAC device;

connecting said first mesh first switch element with said second mesh second switch element by another link and MAC device;

connecting said first mesh second switch element with said second mesh first switch element by still another link and MAC device;

connecting said first mesh second switch element with said second mesh second switch element by a further link and MAC device;

each MAC device transmitting a Hello signal to MAC devices of the other mesh switch, said Hello signal including a mesh ID identifying a respective mesh switch of said MAC device;

each said MAC device recording mesh ID's of said Hello signals received from MAC devices of the other mesh switch;

said TCMP agent of each respective switch forming a trunk list including all MAC devices of respective switches for which Hello signals were received;

each said TCMP agent dividing traffic received for one of said mesh switches among said MAC devices of said trunk list, said dividing being according to a trunking convention.

2. The method of trunking a plurality of mesh switches according to claim 1, further comprising the steps of:

connecting an edge device to said first mesh first switch element by a link and MAC device; and connecting said edge device to said first mesh second switch element by a link and MAC device.

3. The method of trunking a plurality of mesh switches according to claim 1, further comprising the steps of:

connecting said first mesh first switch element to a first switch element of a third mesh switch by a link and MAC device;

connecting said first mesh first switch element to a second switch element of said third mesh switch by a link and MAC device;

connecting said first mesh second switch element to said first switch element of said third mesh switch by a link and MAC device; and connecting said first mesh second switch element to said second switch element of said third mesh switch by a link and MAC device.

4. The method of trunking a plurality of mesh switches according to claim 1, further comprising the steps of:

maintaining current and previous learned trunk lists for every MAC of a respective switch mesh with the TCMP-agent;

whenever the TCMP-agent receives a TCMP hello message, adding the associated mesh ID to the current list for the associated MAC;

if more mesh IDs are learned than a maximum allowable, setting a list overflow indicator;

setting the trunk list and list overflow to null initially and after a TCMP reselection processing; and providing a TCMP reselection time with the TCMP-agent performing reselection processing to select a set of MACs which are eligible to go in use.

5. The method of trunking a plurality of mesh switches according to claim 4, wherein selecting a set of MACs which are eligible to go in use further comprises:

identifying the current learned node trunk list which is common to the greatest number of MACs.

6. The method of trunking a plurality of mesh switches according to claim 5, wherein identifying the current learned trunk list which is common to the greatest number of MACs includes:

rejecting any list which is null or overflowed;

rejecting any list which contains a received trunk ID which is identical to the receiving switch's trunk ID;

from the remaining set of lists, selecting the list(s) which is common to the greatest number of MACs;

if multiple lists are common to the same number of MACs, selecting the list(s) which is longest; and if multiple lists are common to the same number of MACs and they connect the same number of switch links, selecting the list containing the numerically smallest non-intersecting trunk ID.

7. A mesh switch interconnection system, comprising:

a first mesh switch with a first mesh first switch element with an associated trunk configuration management protocol (TCMP) agent and a first mesh second switch element with an associated TCMP agent;

a second mesh switch with a second mesh first switch element with an associated TCMP agent and a second mesh second switch element with an associated TCMP agent;

a link and media access controller (MAC) device, said first mesh first switch element being connected to said second mesh first switch element by said link and said MAC device another link and another MAC device, said first mesh first switch element being connected with said second mesh second switch element by said another link and said another MAC device;

still another link and still another MAC device, said first mesh second switch element being connected with said second mesh first switch element by said still another link and said still another MAC device;

a further link and a further MAC device, said first mesh second switch element being connected with said second mesh second switch element by said further link and said further MAC device;

means implementing a configuration management protocol for control of communication between interconnected mesh switches with each MAC device transmitting a Hello signal to MAC devices of the other mesh switch, said Hello signal including a mesh ID identifying a respective mesh switch of said MAC device, each said MAC device recording mesh the ID of said Hello signals received from MAC devices of the other mesh switch, said TCMP agent of each respective switch forming a trunk list including all MAC devices of respective switches for which Hello signals were received and each said TCMP agent dividing traffic received for one of said mesh switches among said MAC devices of said trunk list, said dividing being according to a trunking convention.

8. The mesh switch interconnection system according to claim 7, further comprising:

an edge device and an associated link and MAC device connecting said edge device to said first mesh first switch element; and another associated link and MAC device connecting said edge device to said first mesh second switch element.

9. The mesh switch interconnection system according to claim 7, further comprising:

a third mesh switch with a third mesh first switch element with an associated trunk configuration management protocol (TCMP) agent and a third mesh second switch element with an associated TCMP agent;

a third mesh switch link and third mesh switch MAC device connecting said first mesh first switch element to said third mesh first switch element by a link and MAC device;

another third mesh switch link and another third mesh switch MAC device connecting said first mesh first switch element to said third mesh second switch element;

still another third mesh switch link and still another third mesh switch MAC device connecting said first mesh second switch element to said third mesh first switch element; and a further third mesh switch link and further third mesh switch MAC device connecting said first mesh second switch element to said third mesh second switch element.

10. The mesh switch interconnection system according to claim 7, further comprising:

current and previous learned trunk lists for every MAC of a respective switch mesh, said lists being maintained with said TCMP-agent wherein when the associated TCMP-agent receives a TCMP hello message, the associated TCMP-agent adds an associated mesh ID to the current list for the associated MAC, if more mesh IDs are learned than a maximum allowable, a list overflow indicator is set, the trunk list and list overflow is set to null initially and after a TCMP reselection processing and a TCMP reselection time is provided with the TCMP-agent performing reselection processing to select a set of MACs which are eligible to go in use.

11. The mesh switch interconnection system according to claim 10, wherein the TCMP agent selects a set of MACs which are eligible to go in use by identifying the current learned node trunk list which is common to the greatest number of MACs.

12. The method of trunking a plurality of mesh switches according to claim 11, wherein identifying the current learned trunk list which is common to the greatest number of MACs includes:

rejecting any list which is null or overflowed;

rejecting any list which contains a received trunk ID which is identical to the receiving switch's trunk ID;

from the remaining set of lists, selecting the list(s) which is common to the greatest number of MACs;

if multiple lists are common to the same number of MACs, selecting the list(s) which is longest; and if multiple lists are common to the same number of MACs and they connect the same number of switch links, selecting the list containing the numerically smallest non-intersecting trunk ID.

* * * * *